United States Patent
Christen et al.

(10) Patent No.: US 6,743,538 B2
(45) Date of Patent: Jun. 1, 2004

(54) FUEL CELL SYSTEM AND METHOD FOR OPERATING SAME

(75) Inventors: Andreas Christen, Leimbach (DE); Jens Thomas Mueller, Munich (DE)

(73) Assignee: DaimlerChrysler AG, Stuttgart (DE)

( * ) Notice: Subject to any disclaimer, the term of this patent is extended or adjusted under 35 U.S.C. 154(b) by 181 days.

(21) Appl. No.: 09/910,004

(22) Filed: Jul. 23, 2001

(65) Prior Publication Data

US 2002/0025465 A1 Feb. 28, 2002

(30) Foreign Application Priority Data

Jul. 22, 2000 (DE) .......................... 100 35 756

(51) Int. Cl.⁷ .............................................. H01M 8/04
(52) U.S. Cl. ............................................ 429/24; 429/30
(58) Field of Search ............................ 429/24, 22, 30, 429/17, 13

(56) References Cited

U.S. PATENT DOCUMENTS 5,981,096 A * 11/1999 Hornburg et al. ............. 429/17
2002/0122966 A1 * 9/2002 Acker et al. .................. 429/24

FOREIGN PATENT DOCUMENTS

| DE | 198 07 876 A1 | 2/1998 |
|----|---------------|--------|
| DE | 100 00 514.4  | 1/2000 |
| DE | 19929732      | 6/2001 |
| DE | 10000514      | 8/2001 |
| WO | 9944253       | 9/1999 |

OTHER PUBLICATIONS

Copy of Search Report.

* cited by examiner

Primary Examiner—Stephen Kalafut
Assistant Examiner—Raymond Alejandro
(74) Attorney, Agent, or Firm—Crowell & Moring LLP

(57) ABSTRACT

A fuel cell system has an anode space and a cathode space with a separating proton-conducting membrane. A cathode feed line is used to feed oxygen-containing gas to the cathode space, and an anode line is used to feed and discharge an operating medium into the anode space. A representative temperature is determined for the system, and metered amounts of operating medium are passed to the cathode space as a function of this temperature. Increasing in the operating medium concentration in the cathode space in this manner causes a reduction in the freezing point and, when the system is started, an exothermic catalytic reaction.

5 Claims, 1 Drawing Sheet

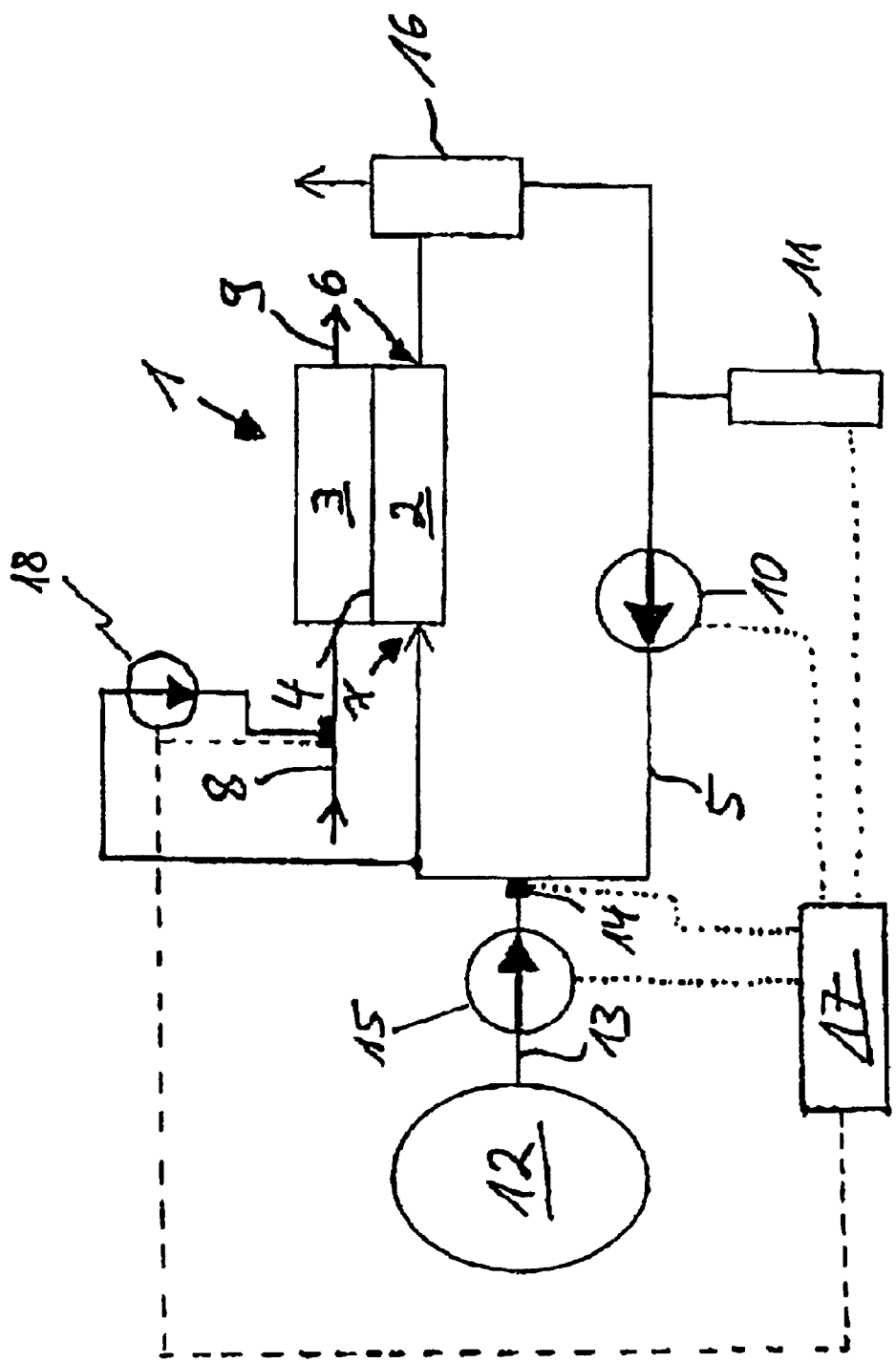
Figure

FUEL CELL SYSTEM AND METHOD FOR OPERATING SAME

BACKGROUND AND SUMMARY OF THE INVENTION

This application claims the priority of German patent document 100 35 756.3, filed Jul. 22, 2000, the disclosure of which is expressly incorporated by reference herein.

The invention relates to a fuel cell system and to a method for operating a fuel cell system.

In fuel cell systems used to generate electrical energy from chemical processes, a plurality of individual fuel cells are combined to form a stack in order to achieve significant electric power. A fuel cell system of this type generally includes an anode space and a cathode space, which are separated from one another by a proton-conducting membrane, a cathode feed line for feeding oxygen-containing gas (such as air) to the cathode space, a cathode exhaust-gas line, and an anode line for feeding and discharging an operating medium to the anode space. In general, hydrogen is used as operating medium of a fuel cell and is ionized with a release of electrons. The resulting hydrogen ions are passed into the cathode space through the membrane, and converted into water with the oxygen supplied. The hydrogen to be supplied may be produced, for example, by reforming hydrocarbons.

In what are known as direct methanol fuel cells (DMFCs), by contrast, a liquid operating medium (methanol)/coolant mixture is passed to the anode space of the fuel cell system. If water is used as the coolant and methanol as the operating medium, a carbon dioxide gas which is enriched with water and methanol is formed at the anode outlet. After the carbon dioxide has been separated off, these products can be recirculated to the anode inlet, it being necessary to meter methanol from a reservoir into this circuit in order to ensure a constant methanol concentration. A fuel cell system of this type is disclosed in German patent document DE 198 07 876 A1.

If, by way of example, a fuel cell system is to be used to provide electric power in a vehicle, antifreeze properties and ability to achieve cold starts are significant criteria for the day-to-day suitability of a system of this type. In the direct methanol fuel cells mentioned, there is a risk of freezing, in particular when the fuel cell is not operating, on account of the use of water in the anode circuit and on account of the water produced at the cathode outlet. The freezing point of the water/methanol mixtures which are customarily used is $-1$ to $-4°$ C. Therefore, at lower temperatures the system has to be preheated, resulting in a long cold start phase.

In a German patent application which was submitted by the present applicant (reference number 100 00 514.4), it is proposed to monitor the temperature in the anode circuit and if it falls below a predetermined threshold, to increase the methanol concentration. This lowers the freezing point of the mixture in the anode circuit. Furthermore, the methanol permeability of the membranes used in these systems causes methanol to diffuse into the cathode space, so that here too the freezing point is lowered. At the same time, when the fuel cell is started, air is introduced into the cathode space; the oxygen which is present in the air undergoes a strongly exothermic reaction with the methanol in the cathode space, so that the cold start process is significantly accelerated.

Since, in operation, the methanol permeability of existing membranes diminishes the efficiency of the fuel cell, the intention is to reduce drastically or eliminate the methanol permeability of the membrane materials. In this case, the methanol permeability, which is advantageous for antifreeze properties and for the cold start process, can then no longer be exploited.

Therefore, it is an object of the present invention to provide a fuel cell system and a method for operating such a system which ensure good cold start performance and sufficient antifreeze properties on the part of the fuel cell system, even if the methanol permeability of the membranes used therein is absent or drastically reduced.

This and other objects and advantages are achieved by the fuel cell system according to the invention, which includes a device for determining a representative temperature, as well as a device for metering and feeding operating medium to the cathode space as a function of the determined temperature. It is appropriate for the representative temperature used to be the ambient temperature, the temperature in the interior of the anode line, of the cathode space or of the cathode feed line or cathode exhaust-gas line. When using the ambient temperature, it should be taken into account that, during and for a long time after operation of the fuel cell system, this temperature differs considerably from that inside the fuel cell system, since the operating temperatures typically lie in the range from 80–120° C.

Since, in the fuel cell system according to the invention, the methanol permeability of the fuel cell membrane is negligible and methanol is introduced only in a temperature-controlled, metered fashion into the cathode side in order to obtain antifreeze properties, the efficiency of the system when it is operating normally is improved relative to the known systems with antifreeze properties as described above.

The measure according to the invention makes it possible to prevent freezing even down to temperatures of $-35°$ C. At the same time, the cold start performance is improved considerably, since after the supply of air to the cathode side has been started, the operating supplied medium (methanol) is catalytically oxidized, and thermal energy is released. The advantages described above can, of course, also be achieved with operating media other than methanol.

Operating medium may be fed to the cathode space in different ways. The operating medium may be introduced from a dedicated reservoir into the cathode feed line or directly into the cathode space. The metering of methanol or of a methanol/water mixture into, for example, the air stream flowing into the cathode space is also conceivable. Finally, the operating medium may be supplied from the anode circuit to the cathode space. This configuration has the advantage that an operating medium/coolant mixture is already present in the anode circuit and can be used immediately.

The metered supply of operating medium may take place continuously as a function of the determined temperature, in which case the metering of operating medium is expediently commenced only when the temperature falls below a predetermined temperature threshold. Furthermore, it is possible to stipulate further temperature thresholds, in order to adapt the antifreeze properties in steps to the actual temperature. It is advantageous for the antifreeze system according to the invention for the cathode side to be combined with an antifreeze system for the anode side, as described in the abovementioned German patent application (ref. 100 00 514.4) in the name of the applicant. In that document, a temperature sensor is provided in the interior of the anode line for the purpose of determining the temperature. This temperature sensor may also be used in the present case to control the device according to the invention for metering and supplying operating medium to the cathode space. It can be assumed that, in particular when the fuel cell system is switched off, the temperatures on the anode side will differ little from those on the cathode side.

Naturally, the temperature may also be determined independently of the temperature on the anode side, for the cathode side alone, by providing a temperature sensor in the cathode space or in the interior of the cathode feed line or cathode discharge line.

It is advantageous to use a combined concentration and temperature sensor, in order to be able to detect the prevailing operating medium concentrations as well as the temperature.

Other objects, advantages and novel features of the present invention will become apparent from the following detailed description of the invention when considered in conjunction with the accompanying drawings.

BRIEF DESCRIPTION OF THE DRAWINGS

The single FIGURE shows a fuel cell system with combined antifreeze properties for the anode and cathode side.

DETAILED DESCRIPTION OF THE DRAWINGS

The fuel cell system 1 illustrated diagrammatically in the FIGURE has an anode space 2 and a cathode space 3, which are separated from one another by a proton-conducting membrane 4. A liquid operating medium/coolant mixture is passed through the anode space 2 via an anode circuit line 5, which connects an anode space outlet 6 to an anode inlet 7 of the fuel cell 1. In this case, the operating medium may be any suitable substance which is liquid at room temperature and can be oxidized electrochemically. The system described in the exemplary embodiment is operated with liquid methanol as operating medium and water as coolant. A system of this type which is operated with liquid methanol/water mixture is referred to as a direct methanol fuel cell (DMFC).

An oxygen-containing gas is passed into the cathode space 3 via a cathode feed line 8. (In this exemplary embodiment, ambient air is used for this purpose.) In the fuel cell 1, methanol is oxidized at the anode, and the atmospheric oxygen is reduced at the cathode. For this purpose, the surfaces of the proton-conducting membrane 4 are coated with suitable catalysts. Positive hydrogen ions then migrate through the proton-conducting membrane 4 and react with oxygen on the cathode side to form water. During this electrochemical reaction, a voltage is formed between the two electrodes. By connecting a large number of fuel cells of this type in parallel or in series to form a stack, it is possible to produce voltages and current intensities which are sufficient, for example, to drive a vehicle.

A carbon dioxide gas which is enriched with water and methanol is formed at the anode outlet 6. This mixture is passed through the anode circuit line 5 by means of a pump 10. A sensor 11, which measures the concentration of the operating medium (methanol) in the anode circuit 5, is connected to a control unit 17, which actuates the injection pump 15 and the injection nozzle 14, in order to inject metered quantities of methanol from the methanol reservoir 12 via line 13 into the anode circuit 5, in such a manner that a fixed methanol/water ratio is maintained. Naturally, a system of this type can also be used to set variable methanol concentrations in the anode line 5.

Carbon dioxide can be separated out of the anode circuit 5, by means of a gas separator 16, so that the overall efficiency of the system is increased.

In addition to the methanol concentration in the anode line 5, the sensor 11 also measures the temperature in the interior of the line. Therefore, the control unit 17 can calculate the quantity of methanol which must be metered in order to maintain optimum antifreeze properties, as a function of the temperature determined in each case and the currently prevailing methanol concentration in the anode circuit 5.

The fuel cells of the system 1 are equipped with proton-conducting membranes 4, the methanol permeability of which is negligible, in order to ensure a sufficiently high efficiency when the system is operating. In order, at the same time, to ensure that the cathode side does not freeze, according to the invention operating medium (methanol) is introduced into the cathode space 3 as a function of the determined temperature. In this exemplary embodiment, the sensor 11 is used for temperature determination, so that there is no need for a dedicated temperature sensor for the cathode side. If the determined temperature $T_{actual}$ falls below a predetermined temperature threshold $T_{threshold}$ (for example 0° C.) the methanol concentration is increased on the cathode side by means of the device 18 for metering and supplying methanol. In this exemplary embodiment, the methanol is introduced into the cathode feed line 8.

According to the invention, methanol from a dedicated reservoir, for example the reservoir 12, can be used for this purpose, although to save on components it may be expedient to use the existing methanol from the anode circuit 5. The currently prevailing methanol concentration in the anode circuit 5 is known at any time because of the measurement carried out by the sensor 11. The control unit 17 can be used to actuate the device 18 in order to introduce a predetermined quantity of the methanol/water mixture present in the anode circuit 5 into the cathode feed line 8 as a function of the determined temperature $T_{actual}$. Naturally, it is also conceivable and possibly expedient to use additional devices, such as for admixing methanol in order to increase the methanol concentration compared to that in the anode circuit 5, a device for separating water out of the methanol/water mixture, or a dedicated sensor for determining the methanol concentration in the cathode space.

Since, in practice, the antifreeze provisions according to the invention generally take effect only when the fuel cell system is switched off (so that the temperature in the system is at risk of falling below 0° C.), it is advantageous if, after operating medium has been added to the cathode space and/or the anode circuit, the operating medium is dispersed in the system, in order to obtain uniform operating medium concentrations throughout. This can be achieved by means of dedicated circulation pumps, such as the pump 10, which operate for a predetermined period until a uniform operating medium concentration has been achieved.

The invention ensures that the cathode side of a fuel cell system does not freeze and considerably improves the cold start properties of the fuel cell system. As a result, the efficiency of the overall system is increased further.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A fuel cell system comprising:
   a fuel cell having an anode space and a cathode space, which are separated from one another by a proton-conducting membrane;

a cathode feed line for feeding oxygen-containing gas to the cathode space;

a cathode exhaust-gas line;

an anode line for feeding and discharging an operating medium to the anode-space inlet and from the anode-space outlet;

a device for determining a temperature;

a device for metering and feeding said operating medium to the cathode space as a function of the determined temperature; and a control unit coupled to control operation of said device for metering and feeding said operating medium, said control unit being programmed to continue operation of said device for metering and feeding said medium as a function of the determined temperature, for a predetermined time period after the fuel cell system is switched off until a uniform operating medium concentration has been achieved in the fuel cell system.

2. A fuel cell system comprising:

a fuel cell having an anode space and a cathode space, which are separated from one another by a proton-conducting membrane;

a cathode feed line for feeding oxygen-containing gas to the cathode space;

a cathode exhaust-gas line;

an anode line for feeding and discharging an operating medium to the anode-space inlet and from the anode-space outlet;

a device for determining a temperature; and a device for metering and feeding operating medium to the cathode space as a function of the determined temperature;

wherein the device for metering and feeding operating medium is connected to the cathode feed line, to introduce operating medium into the cathode feed line.

3. A fuel cell system comprising:

a fuel cell having an anode space and a cathode space, which are separated from one another by a proton-conducting membrane;

a cathode feed line for feeding oxygen-containing gas to the cathode space;

a cathode exhaust-gas line;

an anode line for feeding and discharging an operating medium to the anode-space inlet and from the anode-space outlet;

a device for determining a temperature; and a device for metering and feeding operating medium to the cathode space as a function of the determined temperature;

wherein the device for metering and feeding operating medium is connected between the anode line and the cathode feed line to introduce operating medium from the anode line therein.

4. A fuel cell system comprising:

a fuel cell having an anode space and a cathode space, which are separated from one another by a proton-conducting membrane;

a cathode feed line for feeding oxygen-containing gas to the cathode space;

a cathode exhaust-gas line;

an anode line for feeding and discharging an operating medium to the anode-space inlet and from the anode-space outlet;

a device for determining a temperature; and a device for metering and feeding operating medium to the cathode space as a function of the determined temperature;

wherein the device for determining the temperature comprises a sensor for recording one of the ambient temperature and the temperature in the interior of the anode line.

5. A fuel cell system comprising:

a fuel cell having an anode space and a cathode space, which are separated from one another by a proton-conducting membrane;

a cathode feed line for feeding oxygen-containing gas to the cathode space;

a cathode exhaust-gas line;

an anode line for feeding and discharging an operating medium to the anode-space inlet and from the anode-space outlet;

a device for determining a temperature; and a device for metering and feeding operating medium to the cathode space as a function of the determined temperature;

wherein the device for determining the temperature comprises a sensor for recording the temperature of one of the cathode space, the interior of the cathode feed line and the interior of the cathode discharge line.

* * * * *